United States Patent
Franklin et al.

(10) Patent No.: US 6,444,248 B1
(45) Date of Patent: Sep. 3, 2002

(54) APPARATUS AND METHOD FOR FORMING CASINGLESS SAUSAGES

(75) Inventors: Rodney L. Franklin, Keokuk; Marvin J. Mentjes, Fort Madison; Richard A. Mueller, West Point, all of IA (US); Charles A. Triplett, Surprise, AZ (US)

(73) Assignee: The Dial Corporation, Scottsdale, AZ (US)

( * ) Notice: Subject to any disclaimer, the term of this patent is extended or adjusted under 35 U.S.C. 154(b) by 0 days.

(21) Appl. No.: 09/690,358

(22) Filed: Oct. 17, 2000

Related U.S. Application Data

(60) Provisional application No. 60/160,237, filed on Oct. 18, 1999.

(51) Int. Cl.[7] ............................. A22C 7/00; A23B 4/00
(52) U.S. Cl. ......................... 426/513; 99/353; 99/494; 99/516; 426/277; 452/37
(58) Field of Search ..................... 426/513, 92, 277, 426/646; 452/37, 30; 99/483, 353, 494, 516

(56) References Cited

U.S. PATENT DOCUMENTS

| | | | |
|---|---|---|---|
| 3,885,053 A | 5/1975 | Townsend et al. | |
| 3,889,013 A | 6/1975 | Moule | |
| 4,207,281 A | 6/1980 | Bernard | |
| 4,280,803 A | 7/1981 | Treharne | |
| 4,294,858 A | * 10/1981 | Moule | 426/513 |
| 4,404,229 A | 9/1983 | Treharne | |
| 4,511,592 A | 4/1985 | Percel et al. | |
| 4,747,186 A | 5/1988 | Spike | |
| 4,772,477 A | 9/1988 | Weiss et al. | |
| 4,803,092 A | 2/1989 | Weiss et al. | |
| 4,989,505 A | 2/1991 | Mally | |
| 5,056,425 A | 10/1991 | Mally | |
| 5,115,732 A | 5/1992 | Mally | |
| 5,118,519 A | 6/1992 | Mally et al. | |
| 5,141,762 A | 8/1992 | Mally | |
| 5,236,731 A | * 8/1993 | Becker | 426/513 |
| 5,573,455 A | 11/1996 | Barilli | |
| RE35,426 E | 1/1997 | Mally | |

* cited by examiner

Primary Examiner—George C. Yeung
(74) Attorney, Agent, or Firm—Linda M. Buckley; Steven M. Jensen; Edwards & Angell, LLP

(57) ABSTRACT

The present invention relates to apparatus and method for forming a proteinaceous emulsion or batter into shaped food products such as sausages without the use of a casing. A supply of suitable proteinaceous emulsion is provided and such emulsion is conveyed under pressure into an elongated hollow stuffing tube to form a continuous length of shaped emulsion. Thereafter the shaped emulsion is directed into a molding tube which is slideably mounted about the stuffing tube. As the emulsion enters the molding tube, the pressure of the emulsion causes the molding tube to move away from the stuffing tube. A treating fluid, such as a diluted food grade acid, is directed to the interior surface of the molding tube at about the point where the emulsion first enters the molding tube. The treating fluid is directed to the interior of the molding tube in such a manner that the interior of the molding tube is continuously wetted by the treating fluid as the molding tube moves relative to the stuffing tube. This ensures that the entire surface of the shaped emulsion is contacted by the treating fluid, thereby forming a proteinaceous skin about the shaped emulsion. After the molding tube is filled with the emulsion, it is separated from the stuffing tube, subjected to a heat treatment, and a length of formed sausage is removed from the molding tube and subjected to further processing.

69 Claims, 4 Drawing Sheets

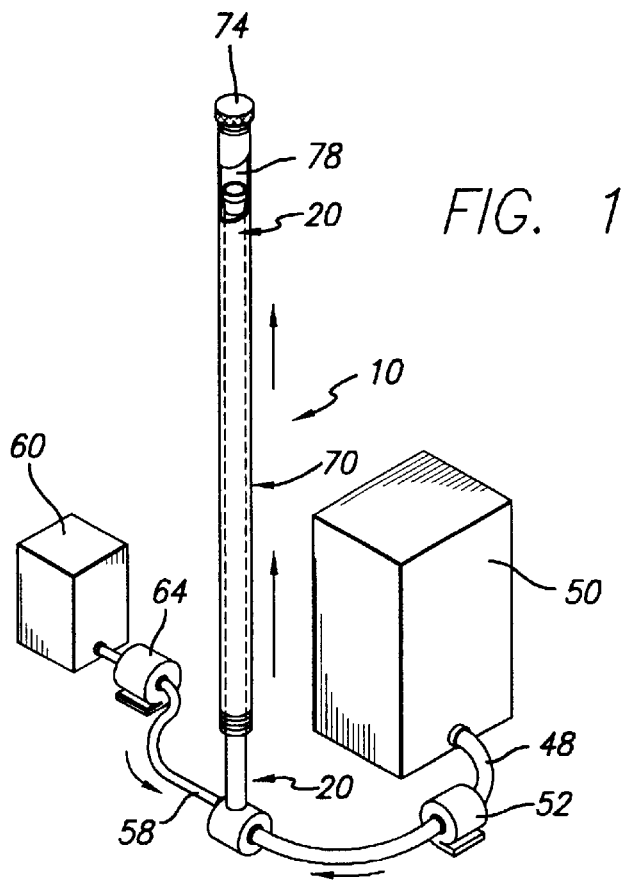
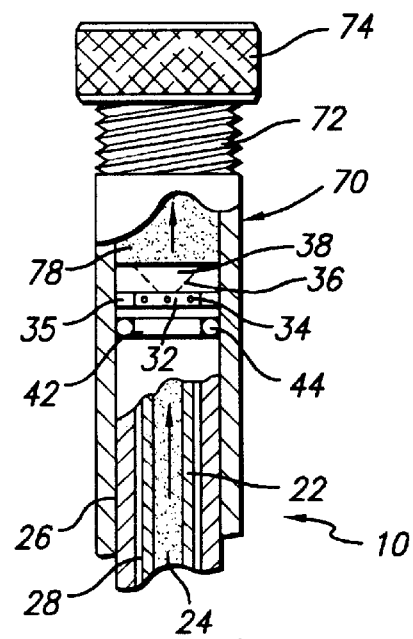
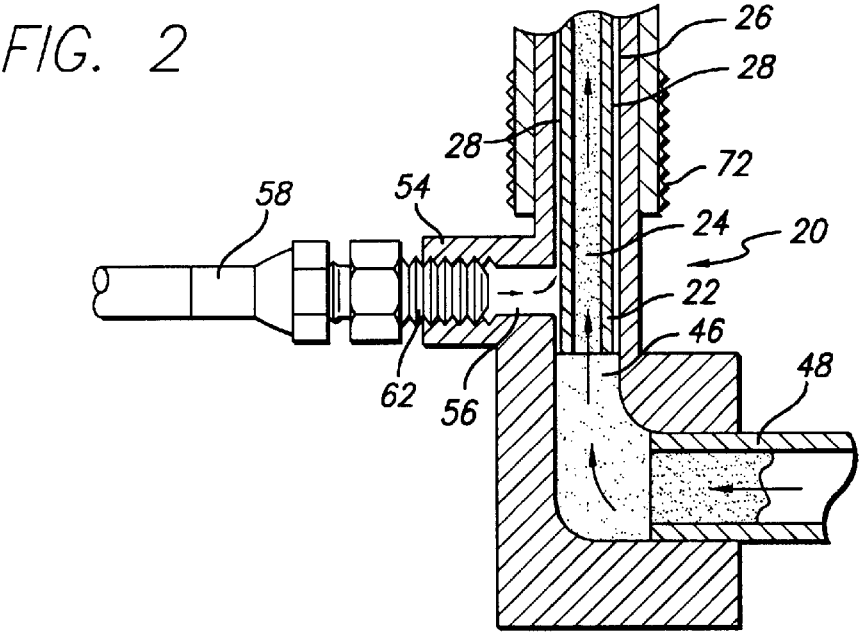
FIG. 1
FIG. 2

APPARATUS AND METHOD FOR FORMING CASINGLESS SAUSAGES

This Non-Provisional Application claims the benefit of U.S. Provisional Application Serial No. 60/160,237 filed on Oct. 18, 1999. The present invention relates to apparatus and methods for forming a proteinaceous emulsion or batter into shaped food products such as sausages without using a casing.

BACKGROUND

Sausages and other formed meat products such as bologna, frankfurters, vienna sausages, and the like are typically made by extruding a proteinaceous meat emulsion or batter into an artificial casing of the desired size and shape and then cooking the batter within the casing. Thereafter, the casing is peeled from the meat product and discarded. Once the casing has been removed, the shaped meat product can be cut into predetermined lengths, placed in suitable containers, and then heated to cook and sterilize the product.

In order to form and process sausages and the like without the need to use casings with their additional costs and problem of disposing of the used casings, various devices and methods for making casingless sausages have been proposed. Among these is the apparatus disclosed in U.S. Pat. Nos. 5,056,425 and 5,118,519 to Mally. The Mally patents disclose apparatus which ejects partially shaped products onto a conveyor assembly. According to the patents, batter is pumped into a molding tube, and a treating assembly is formed as a continuation of the molding tube. The treating assembly functions to introduce treating fluid, typically a food grade acid solution, which causes a proteinaceous skin to form about the batter. A piston or ram mechanism then causes the batter with proteinaceous skin to be deposited onto a conveyor belt. The conveyor belt then continues into a cooking apparatus. Once cooked, the product is canned.

U.S. Pat. No. 3,885,053 to Townsend also discloses a process of forming a skin on an extruded meat emulsion by applying an acid to the surface of the emulsion as the extrusion proceeds. The Townsend patent relies on the use of sintered metal to apply the acid.

SUMMARY OF THE INVENTION

The present invention relates to apparatus and methods for forming a proteinaceous emulsion or batter into shaped food products such as sausages without the use of a casing. A supply of suitable proteinaceous emulsion is provided and such emulsion is conveyed under pressure into an elongated hollow stuffing tube to form a continuous length of shaped emulsion. Thereafter the shaped emulsion is directed into a molding tube which is slideably mounted about the stuffing tube. As the emulsion enters the molding tube, the pressure of the emulsion causes the molding tube to move away from the stuffing tube.

A treating fluid, such as a diluted food grade acid, is directed to the interior surface of the molding tube at about the point where the emulsion first enters the molding tube. The treating fluid is directed to the interior of the molding tube in such a manner that the interior of the molding tube is continuously wetted by the treating fluid as the molding tube moves relative to the stuffing tube. This ensures that the entire surface of the shaped emulsion is contacted by the treating fluid thereby forming a proteinaceous skin about the shaped emulsion.

After the molding tube is filled with the emulsion, it is separated from the stuffing tube, subjected to a heat treatment, and a length of formed sausage is removed from the molding tube and subjected to further processing.

BRIEF DESCRIPTION OF THE DRAWINGS

FIG. 1 is a perspective view of the apparatus used to make casingless food products according to the present invention.

FIG. 2 is a partial sectional view of the combined stuffing tube and molding tube showing the molding tube slideably mounted about the stuffing tube.

DETAILED DESCRIPTION OF THE PREFERRED EMBODIMENTS

Figure 3:
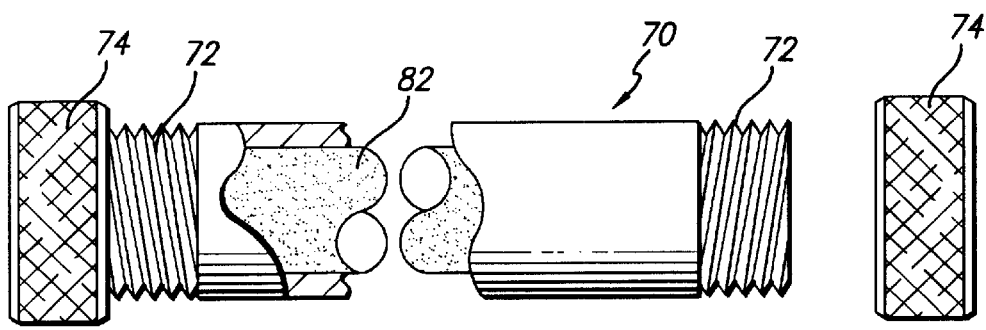
FIG. 3 is a partial sectional view of the molding tube showing the emulsion with a proteinaceous skin.

The following is a description of the forms of the invention which are presently preferred; it being understood, however, that this invention is not limited to the precise arrangements and instrumentalities shown.

As shown in FIGS. 1 and 2, the numeral 10 designates generally the apparatus employed to make casingless food products according to the present invention and includes an elongated tubular shaped stuffing tube 20, a molding tube 70 which closely surrounds stuffing tube 20 and is slideably mounted about the stuffing tube, an emulsion source 50, and a treating fluid source 60.

As shown best in FIG. 2, elongated stuffing tube 20 includes concentrically mounted tubes 22 and 26 with inner tube 22 having bore 24, which bore extends the length of tube 22 and with tube 22 being operably connected to emulsion source 50. An outer tube 26 substantially surrounds the length of inner tube 22 and is operably connected to treating fluid source 60. An annular passage 28 is formed between outer tube 26 and inner tube 22 and serves to conduct the treating fluid to a point of contact with the emulsion 78. As used herein, the term treating fluid means an appropriate diluted food grade acid such as acetic acid, citric acid, maleic acid, or phosphoric acid. The concentration of said acid can range from about 2% to about 80%. A 20% concentration of acetic acid works well. Annular passage 28 terminates at seal 32. A series of apertures 34 are formed about the circumference of tube 26 adjacent to seal 32, and these apertures allow the release of treating fluid from passage 28. It is preferred that apertures 34 be set within annular recess 35 to help prevent clogging of the apertures by emulsion 78. Instead of apertures, a continuous opening about the circumference of the tube 26 may be employed. The exterior surface of inner tube 22 is also provided with channel 42 with O-ring 44 positioned within the channel. O-ring 44 prevents treating fluid exiting from apertures 34 from leaking out from the area between the exterior surface of tube 26 and the interior wall of molding tube 70.

At one end, the stuffing tube 20, which conveys the emulsion, terminates with frustoconically shaped orifice 36 which has an enlarged opening 38 for passage of emulsion 78 into the molding tube 70. At its opposite end, inner tube 22 is connected to pipe 48 by means of elbow shaped connector 46. Pipe 48 is then connected to emulsion source 50. A rotary metering pump 52 is connected between emulsion source 50 and pipe 48 so that emulsion is drawn from emulsion source 50 and pumped into bore 24 of inner tube 22. A suitable rotary metering pump is available from Townsend Engineering Company as a "Frank-a-Matic" metering pump.

As further shown in FIG. 2, annular passage 28 is operably connected to treating fluid source 60 in the following manner. The lower end of stuffing tube 20 is provided with angled extension 54 having passage 56 which communicates with annular passage 28. Pipe 58 conveys treating fluid from treating fluid source 60 to annular passage 28. Pipe 58 is provided with threaded fitting 62 for engagement with the threads of passage 56 of extension 54. A rotary pump 64 is mounted between the treating fluid source 60 and the stuffing tube 20 and is operably connected to pipe 58 to provide treating fluid under pressure to annular passage 28. It is preferred that rotary pump 64 be a non-pulsating pump. A suitable rotary pump is available from Cole-Parmer Instrument Company and includes a "Micropump" pump head #P-0700225 and pump drive P-7522500.

Thus far the stuffing tube 20 and its components have been described which function to form a continuous length of shaped emulsion or batter and to supply a treating fluid, such as food grade acetic acid, for application to the surface of the formed emulsion. The actual application of the treating fluid to the surface of the formed emulsion takes place in the molding tube. As shown in FIGS. 1 and 2, molding tube 70 is slideably mounted about stuffing tube 20 and is sized so that the interior wall of molding tube 70 is in slideable contact with the exterior wall of tube 20, more specifically, the exterior wall of outer tube 26. As shown, molding tube 70 is about the same length as stuffing tube 20 although its length may be longer or shorter than that of the stuffing tube. As shown, molding tube 70 is provided with threaded ends 72 and one end has a threaded cap 74 which seals off an end of the molding tube.

In use, molding tube 70 is placed over stuffing tube 20. Cap 74 is then engaged with the end of molding tube 70 nearest orifice 36 of inner tube 22 so that one end of molding tube 70 is sealed. Pumps 52 and 64 are started. Due to the action of pump 52, emulsion flows under pressure from emulsion source 50, through pipe 48 and into the interior of tube 22, that is bore 24. Simultaneously, treating fluid is pumped from fluid source 60 by means of pump 64 through pipe 58 and into annular passage 28. The treating fluid exits apertures 34 and evenly coats the interior wall of molding tube 70.

Due to the continued action of emulsion pump 52, emulsion travels through bore 24 and exits bore 24 at orifice 36. Similarly, treating fluid travels through annular passage 28 to apertures 34 where it exits the passage 28. The pressurized emulsion 78 exits orifice 36 and bears against the sealed end of molding tube 70. Thus, molding tube 70 is pushed away from orifice 36. As molding tube 70 moves away from orifice 36, treating fluid exits from apertures 34 and coats the inside of molding tube 70. It is then absorbed onto the surface of emulsion 78. It is important that the fluid flow from apertures 34 be continuous so as to evenly coat the inside of molding tube 70. When the emulsion exiting orifice 36 comes into contact with the treating fluid coating the inside of molding tube 70, the proteins in contact with the acid coagulate causing a proteinaceous skin to develop about the surface of the emulsion as it is extruded from orifice 36. The proteinaceous skin provides the aesthetic appearance that consumers like and, in addition, makes the emulsion easier to handle for processing. In addition, the acid treating fluid reacts with nitrates in the emulsion and imparts a pink color to the product which is desired by consumers. Importantly, the treating fluid also lubricates the inside of molding tube 70 so that the emulsion may be easily removed from molding tube 70 after partial cooking.

A further embodiment of the apparatus for forming casingless food products such as sausages is shown in FIGS. 6 through 10, wherein the numeral 110 designates generally the apparatus employed to make casingless food products according to the present invention. The apparatus includes an elongated tubular shaped stuffing tube 120, which includes an inner tube 122 and outer tube 126, a molding tube 70 (see FIG. 1) which closely surrounds stuffing tube 120 and is slideably mounted about the stuffing tube, an emulsion source (not shown), and a treating fluid supply tank 160.

Figure 9:
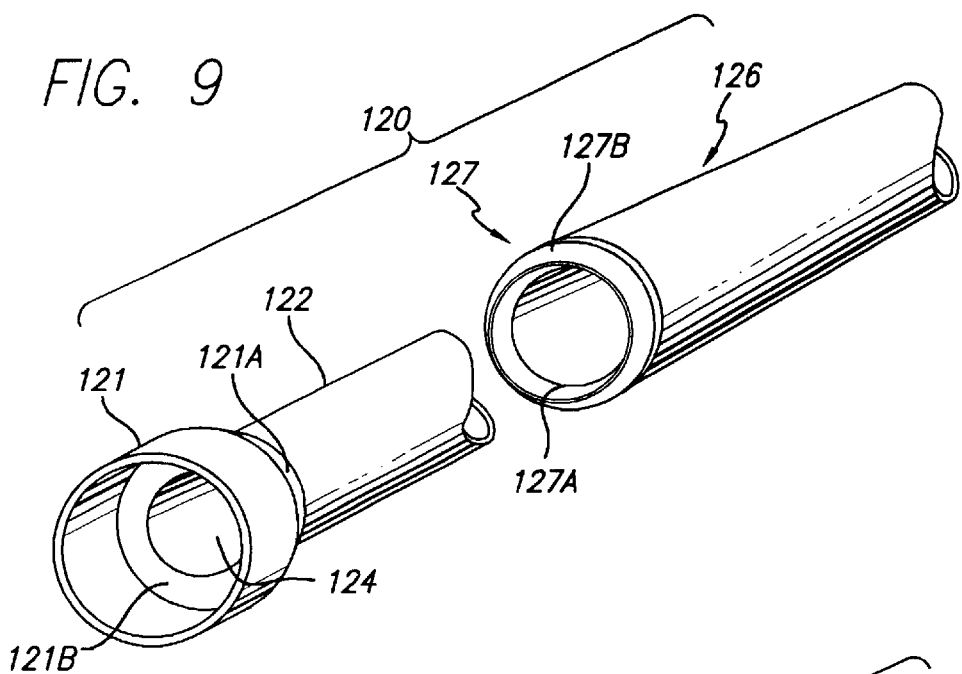
FIG. 9 is a perspective view of the embodiment shown in FIGS. 6 and 7 showing the inner tube and outer tube.
Figure 10:
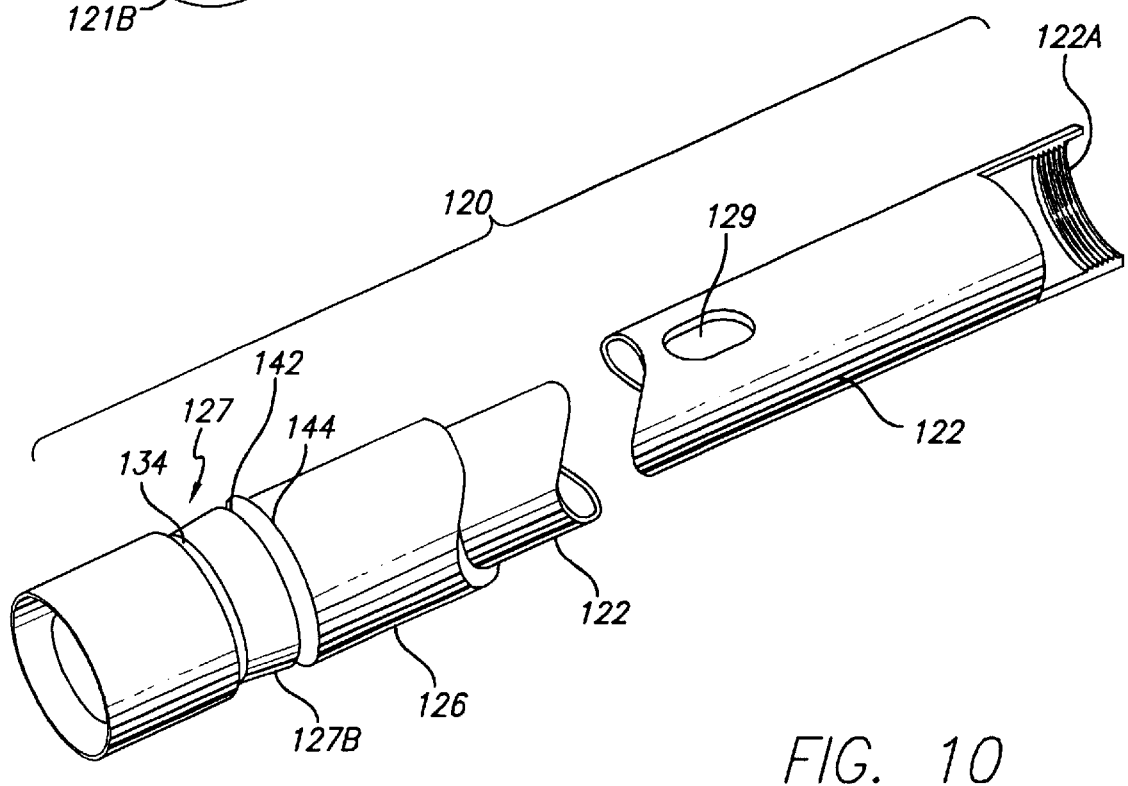
FIG. 10 is a partially broken away view of the embodiment shown in FIGS. 6, 7, and 9 showing the inner tube positioned within the outer tube.

As shown best in FIGS. 9 and 10, elongated stuffing tube 120 includes concentrically mounted inner tube 122 and outer tube 126 with inner tube 122 having bore 124, which bore extends the length of tube 122 and with tube 122 being operably connected to an emulsion source.

Figure 6:
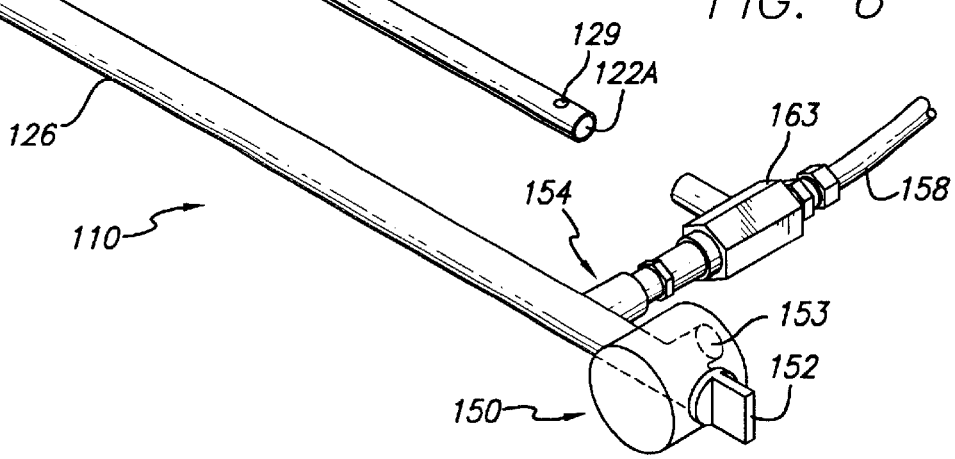
FIG. 6 is a perspective view of a further embodiment of the invention showing the inner and outer tube.
Figure 7:
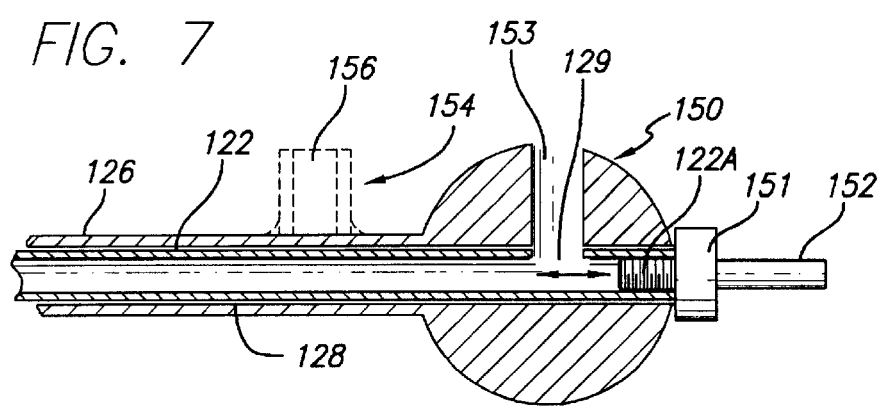
FIG. 7 is a sectional view of the embodiment shown in FIG. 6 showing the inner tube positioned in the outer tube and manifold.

As shown best in FIGS. 6 and 7, at one end, outer tube 126 is welded to the exterior of manifold 150. Annular passage 128 is formed between outer tube 126 and inner tube 122 and is operably connected to treating fluid source 160 in the following manner. The lower end of outer tube 126 is provided with angled extension 154 having passage 156 which communicates with annular passage 128. An adjustable flow control valve 163 is secured to extension 154. Control valve 163 is in turn connected to pipe 158, which conveys treating fluid from treating fluid source 160. Thus, treating fluid is conveyed by pipe 158 from treating supply tank 160, through control valve 163 and extension 154 and into annular passage 128.

Inner tube 122 is concentrically positioned within outer tube 126 and slidable therein. Inner tube 122 is positioned in outer tube 126 and is connected to manifold 150. Opening 129 of inner tube 122 is aligned with passage 153 of manifold 150. Emulsion enters manifold 150 by means of a supply line (not shown) from an emulsion source and the supply line is connected to passage 153. The emulsion then travels through opening 129 and into bore 124 of inner tube 122.

The end of inner tube 122 which passes into and through manifold 150 is provided with internal threads 122A which mate with external threads 151 of hand screw 152. By turning threads 151 of hand screw 152 into and out of engagement with threads 122A of inner tube 122, the vertical position of inner tube 122 within outer tube 126 can be selectively adjusted.

As shown best in FIGS. 9 and 10, the end of inner tube 122 opposite manifold 150 is provided with collar 121, which is of larger diameter than inner tube 122. The exterior of tube 122, has a tapered area 121A which extends between collar 121 and tube 122. The interior of collar 121 also is provided with tapered area 121B which extends between the interior of collar 121 and bore 124 of inner tube 122.

As previously noted, outer tube 126 substantially surrounds the length of inner tube 122 with annular passage 128 formed there between. Annular passage 128 is operably connected to a treating fluid supply tank 160 and serves to conduct the treating fluid to a point of contact with the emulsion. Annular passage 128 terminates at end 127 of outer tube 126. End 127 is provided with both interior tapered area 127A and exterior tapered area 127B. As shown in FIG. 10, a circumferential gap or opening 134 is formed at the junction where tapered area 121A of inner tube 122 abuts tapered area 127A of outer tube 126. Treating fluid from passage 128 is released from gap 134. Importantly, the width of gap 134 is adjusted by selectively changing the vertical position of inner tube 122 within outer tube 126. By turning threads 151 of hand screw 152 into and out of engagement with threads 122A of inner tube 122, the vertical position of inner tube 122 within outer tube 126 is selectively set so that the width of gap 134 is controlled. As gap 134 is widened, more treating fluid is released from passage 128.

The exterior surface of outer tube 126 is also provided with channel 142 with O-ring 144 positioned within the channel. O-ring 144 prevents treating fluid exiting from gap 134 from leaking out from the area between the exterior surface of tube 126 and the interior wall of molding tube 70.

Figure 8:
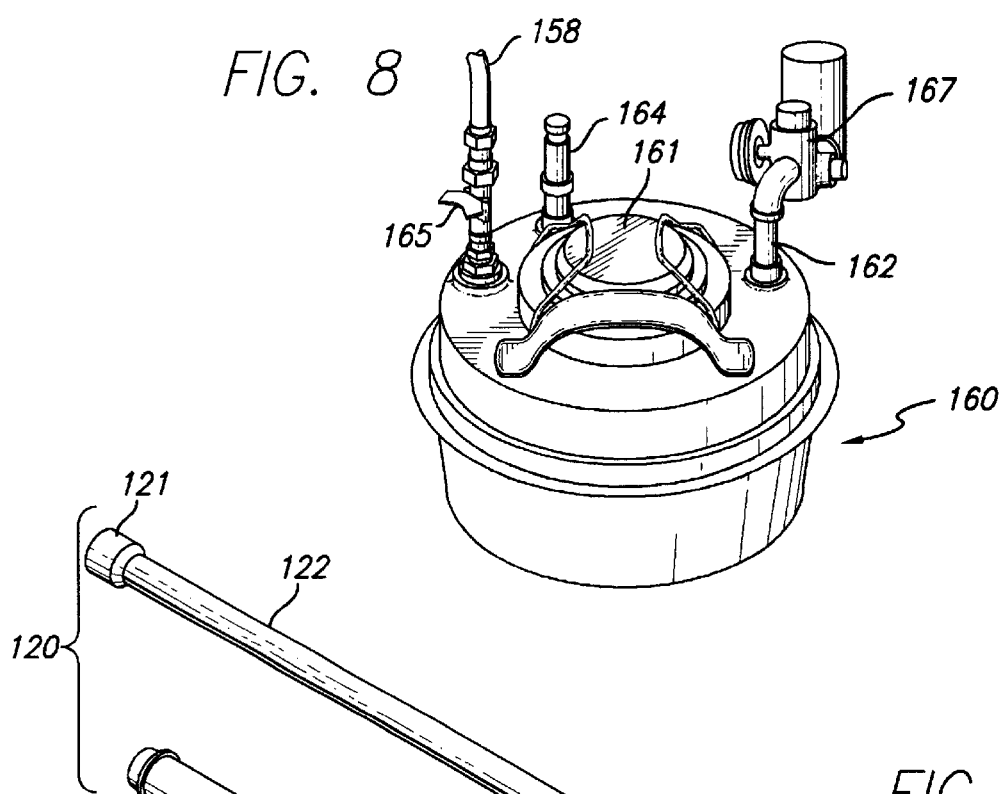
FIG. 8 is a perspective view of the treating fluid supply tank.

Treating fluid supply tank 160 is shown in FIG. 8. Tank 160 is provided with removable cap 161 for the introduction of treating fluid into the tank. Air under pressure is supplied to tank 160 via air line 162, which is provided with air shut off valve 167. Tank 160 is also provided with relief valve 164. It is preferred that air be introduced into tank 160 at a pressure of about 80 to 85 pounds per square inch. Relief valve 164 should be set so that if pressure exceeds the pre-set pressure, the excess pressure is released through the valve 164. Tank 160 is also provided with fluid shut off valve 165 for shutting off the supply of pressurized treating fluid into pipe 158. It is preferred that tank 160 be made of stainless steel, and a suitable tank is available from Alloy Products Corporation.

The application of the treating fluid to the surface of the formed emulsion takes place in the molding tube. As with the embodiment previously described, molding tube 70 is slideably mounted about stuffing tube 120 and is sized so that the interior wall of molding tube 70 is in slideable contact with the exterior wall of tube 120, more specifically, the exterior wall of outer tube 126.

Molding tube 70 is positioned over stuffing tube 120 with the end of molding tube 70 nearest collar 121 of inner tube 122 being sealed. Emulsion under pressure from the emulsion source passes through passage 153 of manifold 150, through opening 129, and into the interior of tube 122, that is bore 124. Simultaneously, treating fluid under pressure from tank 160 enters annular passage 128. The treating fluid exits through gap 134 and evenly coats the interior wall of molding tube 70.

Emulsion under pressure travels through bore 124 and exits at collar 121. Similarly, treating fluid travels through annular passage 128 to gap 34 where it exits annular passage 128. The pressurized emulsion exits bore 124 at collar 121 and bears against the sealed end of molding tube 70, thus causing molding tube 70 to be pushed away from collar 121. As molding tube 70 moves away from collar 121, treating fluid exits from gap 134 and coats the inside of molding tube 70. It is then absorbed onto the surface of the emulsion.

As shown in FIG. 3, when molding tube 70 has been filled with treated emulsion, tube 70 is removed from stuffing tube 20 or stuffing tube 120. The open end of molding tube 70 is then sealed with another threaded cap 74 so that the entire tube is sealed.

Figure 4:
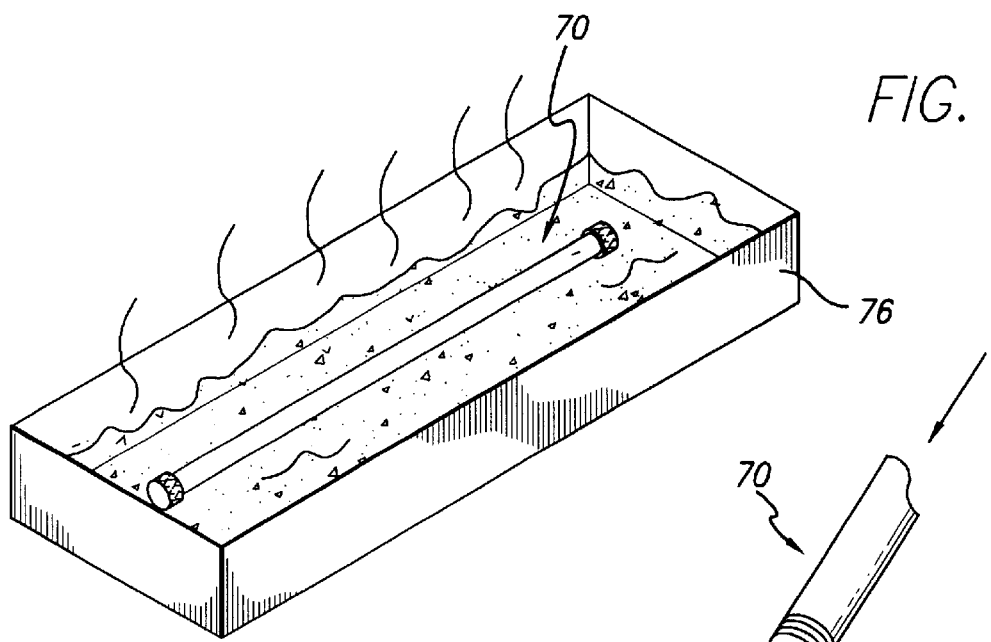
FIG. 4 is a perspective view showing the molding tube in a hot water bath.

As shown in FIG. 4, when both ends of molding tube 70 have been sealed with caps 74, the molding tube is subject to heat treatment by placing it in a water bath 76 to cook the emulsion. A temperature of from about 180° F. to about 210° F. works well. It is preferred that the temperature of the water in bath 76 be about 180° F. and that molding tube 70 remain in the water for about 2 minutes to further coagulate the proteins in the emulsion. Molding tube 70 is then removed from water bath 76 and placed in a second water bath (not shown) for cooling the partially coagulated emulsion. It is preferred that the water in the second water bath have a temperature of about 55° F.

Other heated fluids such as hot air may also be used in the heat treating aspect of the formation of the sausages. The heat treatment serves to coagulate the protein throughout substantially all of the emulsion.

Figure 5:
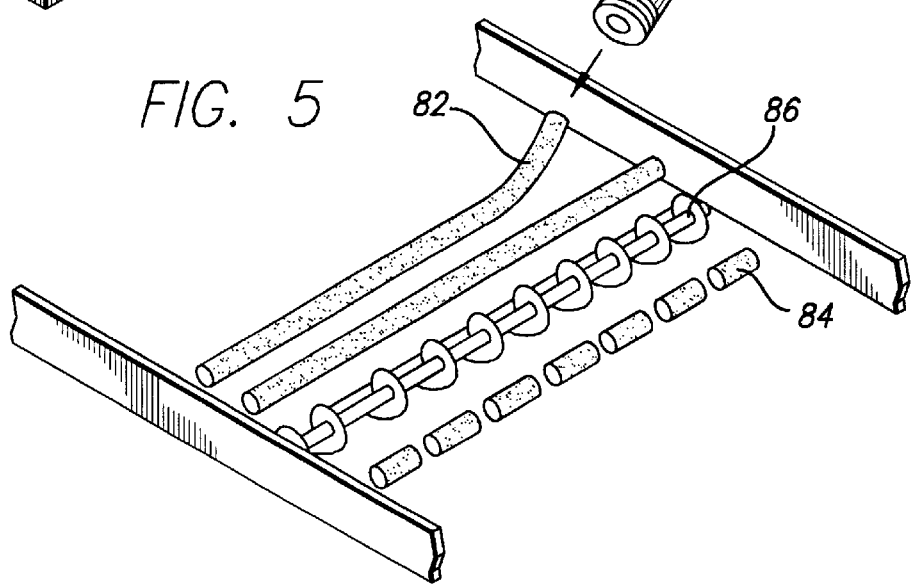
FIG. 5 is a perspective view showing a length of partially coagulated emulsion being removed from the molding tube and cut into suitable lengths for further processing.

Once molding tube 70 and emulsion have been sufficiently cooled, tube 70 is removed from the water bath and both of caps 74 are removed. As shown in FIG. 5, a length of partially coagulated emulsion 82 can then be slid out of molding tube 70 and onto a cutting surface. Rotary mounted cutters 86 then slice the length of partially coagulated emulsion 82 into smaller lengths 84 for placement into cans. The smaller lengths 84 are then canned and sterilized.

What is claimed is:

1. Apparatus for forming a proteinaceous emulsion into shaped food products comprising:

a. a stuffing tube comprising an inner tube and an outer tube substantially surrounding the length of said inner tube;

b. an annular passage formed between said inner tube and said outer tube;

c. an emulsion source operably connected to the interior of said inner tube;

d. a treating fluid source operably connected to said annular passage;

e. a molding tube slidably mounted about said stuffing tube, said molding tube having a closed end and an open end;

f. means for applying a treating fluid to the interior of said molding tube; and g. an orifice in said inner tube for permitting the passage of said emulsion into said molding tube so that said emulsion bears against said closed end of said molding tube and is in contact with said treating fluid.

2. The apparatus of claim 1 wherein said means for applying the treating fluid applies a diluted food grade acid.

3. The apparatus of claim 2 wherein the means for applying the treating fluid applies the diluted food grade acid in a concentration of about 2% to about 80%.

4. The apparatus of claim 3 wherein the means for applying the treating fluid applies the diluted food grade acid in a concentration of about 20%.

5. The apparatus of claim 1 wherein said means for applying said treating fluid to the interior of said molding tube includes apertures in said outer tube, which permit the passage of said treating fluid from said annular passage onto the interior of said molding tube.

6. The apparatus of claim 5 wherein said apertures are set within a recess in said outer tube.

7. The apparatus of claim 5 wherein said outer tube is provided with a means for preventing said treating fluid from leaking from between the exterior surface of said outer tube and said interior of said molding tube.

8. The apparatus of claim 7 wherein said means for preventing said treating fluid from leaking from between the exterior surface of said outer tube an said interior of said molding tube is an O-ring positioned adjacent to said apertures.

9. The apparatus of claim 8 wherein said O-ring is set within a recess.

10. The apparatus of claim 1 wherein said orifice for passage of said emulsion into said molding tube is frusto-conically shaped such that the opening where said emulsion exits said inner tube has a larger diameter than the interior of said inner tube.

11. The method of claim 1, wherein a pump is connected between said emulsion source and said inner tube so that emulsion is drawn from said emulsion source and pumped under pressure into said inner tube.

12. The apparatus of claim 11 wherein said pump is a rotary metering pump.

13. The apparatus of claim 1 wherein a pump is connected between said treating fluid source and said annular passage so that treating fluid is drawn from said treating fluid source and pumped under pressure into said annular passage.

14. The apparatus of claim 13 wherein said pump is a rotary metering pump.

15. The apparatus of claim 1 wherein said the orifice is positioned within a collar portion attached to said inner tube, said collar having a larger interior diameter than the interior diameter of said inner tube.

16. The apparatus of claim 15 wherein said means for applying said treating fluid to said interior of said molding tube includes a gap formed at the junction between said collar portion and an end of said outer tube, said gap releasing said treating fluid from said annular passage and onto the interior of said molding tube.

17. The apparatus of claim 16 wherein means are provided for selectively adjusting the width of said gap.

18. The apparatus of claim 17 wherein said means for selectively adjusting the width of said gap include means for changing the position of said inner tube within said outer tube.

19. The apparatus of claim 18 wherein a first tapered area extends between the exterior of said collar portion and the exterior of said inner tube.

20. The apparatus of claim 19 wherein said end of said outer tube is provided with an interior tapered area.

21. The apparatus of claim 20 wherein said end of said outer tube is provided with an exterior tapered area.

22. The apparatus of claim 21 wherein said gap is formed at the junction between said first tapered area of said collar portion and said interior tapered area on said end of said outer tube.

23. The apparatus of claim 18 wherein said means for changing the position of said inner tube within said outer tube is a screw means which engages the end of said inner tube opposite said orifice for passage of emulsion.

24. The apparatus of claim 18 wherein said outer tube is provided with means for preventing said treating fluid from leaking from between the exterior of said outer tube and said interior of said molding tube.

25. The apparatus of claim 24 wherein said means for preventing said treating fluid from leaking from between the exterior of said outer tube and said interior of said molding tube is an O-ring set positioned adjacent to said gap on said outer tube.

26. The apparatus of claim 25 wherein said O-ring is positioned within a recess.

27. The apparatus of claim 1 wherein said treating fluid source is a pressurized treating fluid supply tank.

28. The apparatus of claim 27 wherein said treating fluid source includes the tank and a source of air supplied to the tank under pressure.

29. The apparatus of claim 28 wherein said treating fluid source includes the source of air supplied to the tank at a pressure of about 80 to about 85 pounds per square inch.

30. The apparatus of claim 29 wherein said tank is operably connected to said annular passage so that pressurized treating fluid from said tank is supplied to said annular passage.

31. The apparatus of claim 30 wherein said tank is provided with a air shut off valve.

32. The apparatus of claim 31 wherein said tank is provided with a fluid shut off valve.

33. A method for forming a proteinaceous emulsion into shaped food products comprising:
   a. operably connecting an emulsion source to the interior of an inner tube;
   b. positioning an outer tube about said inner tube so that an annular passage is formed between said inner tube and said outer tube;
   c. operably connecting a source of treating fluid to said annular passage;
   d. slidably mounting a molding tube over said outer tube, said molding tube having a closed end and an open end;
   e. applying a treating fluid from said treating fluid source to the interior of said molding tube; and
   f. extruding said emulsion into said molding tube from an orifice in said inner tube so that said emulsion bears against said closed end of said molding tube causing said molding tube to move away from said orifice and so that said emulsion is in contact with said treating fluid.

34. The method of claim 33 further comprising:
   a. removing said molding tube from said outer tube;
   b. sealing said open end of said molding tube;
   c. placing said molding tube in a heated fluid to at least partially cook said emulsion.

35. The method of claim 34 wherein said heated fluid is air.

36. The method of claim 34 wherein said heated fluid is water.

37. The method of claim 36 wherein the temperature of said water is about 180° F. to 210° F.

38. The method of claim 37 wherein said molding tube is allowed to remain in said water for about 2 minutes.

39. The method of claim 34 further comprising:
   a. removing said molding tube from said fluid;
   b. removing the seals from both ends of said molding tube;
   c. removing said partially cooked emulsion from said molding tube; and
   d. cutting said partially cooked emulsion into smaller lengths.

40. The method of claim 34 wherein said treating fluid is a diluted food grade acid.

41. The method of claim 40 wherein the concentration of said acid is about 2% to about 80%.

42. The method of claim 41 wherein the concentration of said acid is about 20%.

43. The method of claim 34 wherein said means for applying said treating fluid to the interior of said molding tube includes apertures in said outer tube, which permit the passage of said treating fluid from said annular passage onto the interior of said molding tube.

44. The method of claim 43 wherein said apertures are set within a recess in said outer tube.

45. The method of claim 43 wherein said outer tube is provided with a means for preventing said treating fluid from leaking from between the exterior surface of said outer tube and said interior of said molding tube.

46. The method of claim 45 wherein said means for preventing said treating fluid from leaking from between the exterior surface of said outer tube an said interior of said molding tube is an O-ring positioned adjacent to said apertures.

47. The method of claim 46 wherein said O-ring is set within a recess.

48. The method of claim 34 wherein said orifice for extrusion of said emulsion into said molding tube is frustoconically shaped such that the opening where said emulsion exits said inner tube has a larger diameter than the interior of said inner tube.

49. The method of claim 34, wherein a pump is connected between said emulsion source and said inner tube so that emulsion is drawn from said emulsion source and pumped under pressure into said inner tube.

50. The method of claim 49 wherein said pump is a rotary metering pump.

51. The method of claim 34 wherein a pump is connected between said treating fluid source and said annular passage so that treating fluid is drawn from said treating fluid source and pumped under pressure into said annular passage.

52. The method of claim 34 wherein said the orifice is positioned within a collar portion attached to said inner tube, said collar having a larger interior diameter than the interior diameter of said inner tube.

53. The method of claim 52 wherein said means for applying said treating fluid to said interior of said molding tube includes a gap formed at the junction between said collar portion and an end of said outer tube, said gap releasing said treating fluid from said annular passage and onto the interior of said molding tube.

54. The method of claim 53 wherein means are provided for selectively adjusting the width of said gap.

55. The method of claim 54 wherein said means for selectively adjusting the width of said gap include means for changing the position of said inner tube within said outer tube.

56. The method of claim 55 wherein a first tapered area extends between the exterior of said collar and the exterior of said inner tube.

57. The method of claim 56 wherein said end of said outer tube is provided with an interior tapered area.

58. The method of claim 57 wherein said end of said outer tube is provided with an exterior tapered area.

59. The method of claim 58 wherein said gap is formed at the junction between said first tapered area of said collar and said interior tapered area on said end of said outer tube.

60. The method of claim 55 wherein said means for changing the position of said inner tube within said outer tube is a screw means which engages the end of said inner tube opposite said orifice for passage of emulsion.

61. The method of claim 55 wherein said outer tube is provided with means for preventing said treating fluid from leaking from between the exterior of said outer tube and said interior of said molding tube.

62. The method of claim 61 wherein said means for preventing said treating fluid from leaking from between the exterior of said outer tube and said interior of said molding tube is an O-ring set positioned adjacent to said gap on said outer tube.

63. The method of claim 62 wherein said O-ring is positioned within a recess.

64. The method of claim 34 wherein said treating fluid source is a pressurized treating fluid supply tank.

65. The method of claim 64 wherein said tank is supplied with a source of air under pressure.

66. The method of claim 65 wherein air under pressure is at a pressure of about 80 to about 85 pounds per square inch.

67. The method of claim 66 wherein said tank is operably connected to said annular passage so that pressurized treating fluid from said tank is supplied to said annular passage.

68. The method of claim 67 wherein said tank is provided with a air shut off valve.

69. The method of claim 68 wherein said tank is provided with a fluid shut off valve.

* * * * *